United States Patent [19]
Robson

[11] Patent Number: 4,560,542
[45] Date of Patent: Dec. 24, 1985

[54] METHOD FOR THE PREPARATION OF ZEOLITES USING A LOW WATER LOW ALKALI METAL CONTENT GEL

[75] Inventor: Harry E. Robson, Baton Rouge, La.

[73] Assignee: Exxon Research and Engineering Co., Florham Park, N.J.

[21] Appl. No.: 679,136

[22] Filed: Dec. 6, 1984

[51] Int. Cl.[4] ............................................. C01B 33/28
[52] U.S. Cl. .................................. 423/328; 423/329; 502/60; 502/77
[58] Field of Search .................. 423/328, 329; 502/77, 502/60

[56] References Cited

U.S. PATENT DOCUMENTS

| | | | |
|---|---|---|---|
| Re. 28,341 | 2/1975 | Wadlinger et al. | 208/120 |
| 3,578,398 | 5/1971 | Jenkins | 23/113 |
| 3,642,434 | 2/1972 | Dwyer | 23/113 |
| 3,702,886 | 11/1972 | Arganer et al. | 423/328 |
| 3,793,385 | 2/1974 | Bond et al. | 260/674 SA |
| 4,046,859 | 9/1977 | Plank et al. | 423/328 |
| 4,060,590 | 11/1977 | Whittam et al. | 423/328 |
| 4,310,440 | 1/1982 | Wilson et al. | 252/435 |
| 4,444,738 | 4/1984 | Suzuki et al. | 423/329 |

FOREIGN PATENT DOCUMENTS 1334243 10/1973 United Kingdom .

OTHER PUBLICATIONS

Ryszard Mostowicz et al., "Morphological Study of ZSM-5 Grown in the 12 $Na_2O$/4.5 $(TPA)_2O$ System, *Zeolites* vol. 3, No. 3, Jul. 1983, pp. 219-225.

*Primary Examiner*—John Doll
*Assistant Examiner*—Jackson Leeds
*Attorney, Agent, or Firm*—Marthe L. Gibbons

[57] ABSTRACT

An improved method is provided for the preparation of organic cation-containing zeolites and their thermal decomposition products, by adding the organic templating agent to a preformed aluminosilicate gel containing less than a specified amount of water and a low alkali metal content, and maintaining the mixture at crystallization conditions until the crystalline aluminosilicate zeolite is formed.

15 Claims, No Drawings

METHOD FOR THE PREPARATION OF ZEOLITES USING A LOW WATER LOW ALKALI METAL CONTENT GEL

BACKGROUND OF THE INVENTION

1. Field of the Invention

The present invention relates to an improved method for the preparation of crystalline aluminosilicate zeolites.

2. Description of the Prior Art

It is known to produce crystalline aluminosilicates from a reaction mixture comprising a source of silica, a source of alumina, water and an organic templating agent. The resulting zeolite associated with the organic templating agent is calcined to remove the organic moiety and leave a hydrogen cation associated with the anion framework of the zeolite. See, for example, Zeolite Beta described in U.S. Pat. No. Re. 28,341 (reissue of U.S. Pat. No. 3,308,069), Zeolite ZSM-5 described in U.S. Pat. No. 3,702,886, Zeolite NU-1 described in U.S. Pat. No. 4,060,590, the teachings of which are hereby incorporated by reference. Zeolite ZSM-8 is described in British Pat. No. 1,334,243.

It has now been found that less organic templating agent is required to form the organic cation-containing zeolite when a source of organic templating agent is added to a preformed aluminosilicate gel containing a low amount of water and a low alkali metal content.

U.S. Pat. No. 3,578,398 discloses the synthesis of a zeolite similar to offretite. The reactants comprise sodium aluminate, potassium hydroxide, silica hydrosol and tetramethylammoniumhydroxide. In Example 1, colloidal silica is reacted with sodium aluminate and aged. The aged product, a hydrogel, is then reacted with tetramethylammoniumchloride.

U.S. Pat. No. 3,642,434 discloses a method of preparation of ZSM-4. Solutions comprising sodium aluminate, sodium silicate and aluminum chloride are reacted to form a slurry. Tetramethylammoniumhydroxide is then reacted with the slurry.

U.S. Pat. No. 4,046,859 discloses a method of synthesizing ZSM-21. Example 1 shows that solutions comprising sodium silicate, sodium aluminate and aluminum sulfate are reacted to form a gel. The gel is mixed with 2-hydroxyethyl trimethylammoniumchloride. The mixture is crystallized to form a zeolite.

U.S. Pat. No. 3,793,385 discloses a hydrocarbon separation process in which at least one $C_8$ aromatic isomer is separated from a mixture of $C_8$ aromatic isomers using zeolite Beta as sorbent.

SUMMARY OF THE INVENTION

In accordance with the invention, there is provided a method for the preparation of a crystalline aluminosilicate which comprises: (a) forming a reaction mixture comprising a source of alumina, a source of silica, a source of an organic templating agent and water; (b) maintaining said mixture at a temperature ranging from about 75° to about 200° C. until crystals of a zeolite are formed, and (c) recovering said zeolite from said reaction mixture, the improvement which comprises: (d) first forming an aluminosilicate gel having less than about 10 mole $H_2O$ per gram atom of silicon and an alkali metal content of less than about 0.4 atom per atom of silicon, and (e) subsequently mixing said organic templating agent with said gel.

DETAILED DESCRIPTION OF THE INVENTION

The improved zeolite preparation method of the present invention is suitable for the preparation of crystalline aluminosilicate zeolites which are prepared from a reaction mixture comprising a source of an organic templating agent, a source of alumina, a source of silica and water.

To prepare a zeolite in accordance with the method of the present invention, a source of an organic templating agent is added to an aluminosilicate gel having less than 10 moles $H_2O$, preferably less than 5 moles $H_2O$, more preferably less than 2 moles $H_2O$ per gram atom of silicon and less than 0.4 gram atom, preferably less than 0.1 gram atom alkali metal per gram atom of silicon (i.e., dry gel having low alkali metal content). Suitable organic templating agent may be any of the organic materials that become associated with the crystal structure of the zeolite and which, upon calcination, are removed from the zeolite while leaving a hydrogen cation associated with the anionic framework of the resulting zeolite. By way of example, suitable organic templating agents include quaternary ammonium compounds, such as quaternary alkyl ammonium compounds (e.g., tetraethylammonium hydroxide or chloride and tetrapropylammonium hydroxide or chloride); alcohols; amines; and other templating agents such as those described in Table A of U.S. Pat. No. 4,310,440 and mixtures thereof. The templating agent affects the size and/or shape of the pores that result from calcination of the organic template-associated zeolite.

The aluminosilicate gel is prepared by reacting a source of silica, a source of alumina and water to form a hydrogel which is washed and dried at conditions to give the desired low water content gel. Suitable source of alumina includes alkali metal aluminates, $AlCl_3$, alumina sol, $NaAlO_2$, $AlCl_3$, $Al_2(SO_4)_3$ and mixtures thereof. Preferably, the source of alumina is aluminum sulfate or sodium aluminate. Suitable source of silica includes colloidal silica, silica gel, sodium silicate. The silica source is a water soluble silica.

The mole ratio of alumina to silica in the mixture to produce the hydrogel may range from 0.001 to 1.0 Al/Si. The moles of water to gram atom silicon in the mixture to produce the hydrogel may range from 5.0 to 100. The resulting hydrogel may be washed to remove residual soluble salts and to ensure that the alkali metal content of the hydrogel is below 0.4 gram atom alkali metal per gram atom silicon, preferably below 0.1 gram atom alkali metal per gram atom of silicon. The hydrogel, which may comprise from 0.1 to 10 moles $H_2O$ per gram atom silicon, is dried at a temperature ranging from 90° to 150° C., preferably from 100° to 120° C. for a time sufficient to form the corresponding aluminosilicate gel having less than 10 moles $H_2O$, preferably less than 5 moles $H_2O$, more preferably less than 2 moles $H_2O$ per gram atom silicon and an alkali metal content of less than 0.4 atom alkali metal, preferably less than 0.1 atom alkali metal per gram atom of silicon.

The dried gel may be represented by the formula

$$MAlO_2 \cdot xSiO_2 \cdot wH_2O$$

wherein M is a cation selected from hydrogen, an alkali metal and mixtures thereof, x is a number ranging from 1 to 1000 and w is a number of less than 10x.

A fluid medium containing an organic templating agent is added to the preformed dried gel. The source of the organic templating agent may be any of the organic materials which are convertible to the hydrogen cation upon calcination of the zeolite. Preferably, the organic templating agent is derived from a quaternary ammonium compound such as tetraethylammonium hydroxide, tetraethylammonium chloride, tetrapropylammonium hydroxide, and tetrapropylammonium chloride.

The reaction mixture of preformed gel and organic templating agent is maintained at a temperature ranging from 75° to 200° C., preferably from 100° to 150° C. until crystals of a zeolite associated with the organic templating agent are formed. The zeolite associated with the organic templating agent is recovered from the reaction mixture and calcined at a temperature ranging from 100° to 900° C., preferably from 300° to 600° C., to form the corresponding hydrogen form of the anhydrous zeolite.

The resulting calcined zeolite may be ion exchanged by contact with a fluid medium comprising a cation selected from Group I through VIII of the Periodic Table of Elements, rare earth metals, hydrogen ion, ammonium ions and mixtures thereof.

When the cation of the initial zeolite is sodium, the zeolite may be ion exchanged with an alkali metal other than sodium, e.g., cesium and/or potassium to replace the sodium cation with the other alkali metals that may be more desirable for certain uses.

Furthermore, if desired, metal components of Groups I through VIII and mixtures thereof of the Periodic Table of Elements may be deposited on the surface of the organic cation-containing zeolite, the calcined zeolite, or the calcined and ion-exchanged zeolite, by any conventional means, thereby using the given zeolites as supports for the metal components. The metal components may be deposited in any conventional way, including vapor phase deposition, impregnation, etc.

The zeolites prepared according to the method of the present invention may be used alone as catalysts or as sorbents. Furthermore, the zeolites may be used as catalyst component, sorbent component, catalyst support or sorbent support by compositing them with sorption active materials or catalytic materials, for example, with materials which function as hydrocarbon treating and conversion catalysts in such processes as cracking, hydrocracking, polymerization, disproportionation, demetallization, hydrogenation, hydrodesulfurization, hydrorefining, denitrogenation, etc. The zeolites may also be used in catalysts for hydrocarbon synthesis and gas conversion to hydrocarbons and hydrocarbon derivatives. The zeolites may be used for the selective separation of hydrocarbons such as, for example, the separation of one $C_8$ aromatic isomer from other $C_8$ aromatic isomers such as described in U.S. Pat. No. 3,793,385, the teachings of which are hereby incorporated by reference. The catalytically active metals or sorption active metals or components may be combined with the zeolites of the present invention in any way known in the art and at any suitable stage of the preparation of the zeolite, including before or after calcination of the zeolite. The zeolites of the present invention may also be composited with non-metal catalytic components; inert materials; supports such as inorganic oxides, for example, silica, silica-alumina, alumina, zirconia, magnesia, titania, iron oxide; clay; acid-treated clays; carbon, etc. The zeolites may be used alone, or in admixture with other components. When the zeolite is used with other inert, catalytically active or sorption active materials, the zeolite may be used as a composite particle or the zeolite may be used as a physical mixture of separate particles of the zeolite and particles of other catalytic or inert components. The operating conditions to be employed in the practice of the zeolite prepared in accordance with the present invention are well known and vary with the particular reaction desired.

DESCRIPTION OF THE PREFERRED EMBODIMENT

The preferred embodiment will be described with reference to the preparation of Zeolite Beta.

Zeolite Beta is described in U.S. Pat. No. Re. 28,341, the teachings of which are hereby incorporated by reference. The composition of zeolite Beta is represented by the molar formula:

$$[XNa(1.0\pm0.1-X)TEA]AlO_2.YSiO_2.WH_2O$$

wherein X is less than 1, Y is greater than 5 but less than 100, W is up to about 4 and TEA represents tetraethylammonium ion. Its calcined form is useful as catalyst, catalyst component, sorbent, sorbent component, etc. Zeolite Beta is characterized by the specified X-ray diffraction pattern shown in Table 4 of U.S. Pat. No. Re. 28,341. The described method of preparing zeolite Beta is to prepare a reaction mixture comprising silica, tetraethylammonium aluminate, and aqueous tetraethylammonium hydroxide, maintaining the mixture at a temperature of 75° to 200° C. until zeolite crystals form and separating the crystals from the reaction mixture. The resulting tetraethylammonium-containing zeolite is calcined to convert the tetraethylammonium ion to a hydrogen ion.

The improved method of the present invention for the preparation of a Beta-type zeolite comprises reacting a source of alumina, water, and a source of silica, for example, in a mole ratio of alumina to silica ranging from 0.01:1 to 0.2:1, preferably 0.02:1 to 0.1:1 and, optionally, an alkali metal oxide, to form the corresponding aluminosilicate hydrogel. When the source of alumina is an alkali metal hydroxide or an alkali metal aluminate, the alkali metal may be a single alkali metal hydroxide or aluminate, respectively, or a mixture of alkali metal hydroxides or aluminates, respectively. Preferably, the source of alumina is aluminum sulfate or sodium aluminate. The preferred source of silica is colloidal silica sol. The reaction mixture is maintained at ambient temperature for a time sufficient to form an aluminosilicate hydrogel which may comprise from 5 to 100 mole of $H_2O$ per atom of silicon. If the hydrogel has an alkali metal content above 0.4 atom alkali metal, it may be washed with water to remove residual soluble salts to less than 0.4 atom alkali metal, preferably less than 0.1 atom alkali metal per atom of silicon. The low alkali metal-containing aluminosilicate hydrogel is dried at conditions to produce an aluminosilicate gel having less than 10 moles $H_2O$, preferably less than 5 moles $H_2O$, more preferably, less than 2 moles $H_2O$ per mole of silicon, and an alkali metal content of less than 0.4 atom, preferably less than 0.1 atom alkali metal per atom of silicon. Suitable drying temperatures include a temperature ranging from about 90° to 150° C., preferably from about 100° to 120° C. The pressure is not critical and may be atmospheric, subatmospheric or superatmospheric. The resulting washed and dried gel may be represented by the molar formula MalO₂.xSiO₂ wherein M is a cation selected from the group consisting of an alkali metal cation, hydrogen and mixtures thereof and x is a number ranging from 5 to 100.

An aqueous solution comprising tetraethylammonium hydroxide, or tetraethylammonium chloride or mixtures thereof or reactants which produce the tetraethylammonium ion in situ, i.e., triethylamine plus ethyl chloride, is subsequently added to the preformed gel thereby forming a reaction mixture having the following composition in terms of mole ratios relative to one atom of silica:

| Reaction Mixture | Broad Range | Preferred Range |
|---|---|---|
| H₂O/SiO₂ | 2 to 10 | 4 to 7 |
| OH⁻/SiO₂ | 0 to 1 | 0.001 to 0.5 |
| Al/SiO₂ | 0.01 to 0.2 | 0.02 to 0.15 |
| Alkali Metal (e.g., Na⁺)/SiO₂ | 0 to 0.4 | 0 to 0.1 |
| TEA/SiO₂ | 0.05 to 0.6 | 0.10 to 0.30 | wherein TEA designates a tetraethylammonium cation.

The reaction mixture is maintained at a temperature ranging from about 75° to about 200° C., preferably from about 100° to about 150° C. autogenous pressure until zeolite crystals are formed. If desired, superatmospheric pressures may be used. Typically, the time period until crystals are formed ranges from about 48 to about 168 hours. After the crystals are formed, the zeolite crystals are separated from the reaction mixture (i.e., from the mother liquor) by conventional means, such as filtration. The recovered zeolite has a composition which can be expressed by the molar formula (1):

$$1.3 \pm 0.2[xM+(1-x)R]_2O \cdot Al_2O_3 \cdot ySiO_2 \cdot wH_2O$$

wherein x is a number less than 1, y is a number greater than 10 but less than 200, w is a number up to 40, M represents a hydrogen cation, an alkali metal cation or mixtures thereof, and R represents a tetraethylammonium cation. The significant lines of the X-ray diffraction pattern of the zeolites of formula (1) are given in Table I.

TABLE I

| Interplanar Spacing d(Å) | Relative Intensity |
|---|---|
| 11.47 | 62B[1] |
| 7.54 | 13B |
| 6.63 | 02 |
| 6.00 | 09B |
| 5.34 | 03 |
| 4.89 | 07B |
| 4.37 | 08 |
| 4.13 | 15 |
| 3.95 | 100 |
| 3.51 | 06 |
| 3.31 | 14 |
| 3.10 | 19B |
| 3.02 | 13 |
| 2.91 | 14B |
| 2.68 | 10B |
| 2.07 | 11B |

[1]B designates a broad line.

If desired, the alkali metal-containing initial zeolite of formula (1) may be subjected to ion-exchange in a conventional way to remove at least a portion of the actual alkali metal present in the zeolite by contacting the zeolite with a fluid medium, such as a solution containing a cation selected from the group consisting of hydrogen ion, ammonium ion, metals of Groups I through VIII, including Groups IA, IIA, IB, IIB, IIIB, IV, VB, VIB, VIIB, VIII of the Periodic Table of Elements and mixtures thereof. The Periodic Table referred to herein is in accordance with the Table in *Handbook of Chemistry & Physics*, with Chemical Rubber Publishing Company, Cleveland, Ohio, 45th Edition 1964. Ion-exchange methods are well known and are described, for example, in U.S. Pat. No. 3,140,249; U.S. Pat. No. 3,140,251, and U.S. Pat. No. 3,140,253, the teachings of which are hereby incorporated by reference.

The alkali metal and TEA-containing zeolite of formula (1) may be calcined by heating at a temperature ranging from about 200° C. to 900° C. to decompose the tetraethylammonium ion to a hydrogen ion and produce a calcined Beta-type zeolite that may be represented by the formula (2):

$$\left[ \frac{xM}{n}(1 \pm 0.1 - x)H \right] AlO_2 \cdot ySiO_2$$

wherein x is a number less than 1, y is a number greater than 10 but less than 200, M is a cation selected from the group consisting of hydrogen, alkali metal and mixtures thereof, and n is the valence of M. If the zeolite has been ion exchanged, M would be, at least in part, the cation that was introduced by ion exchange. The zeolite of formula (2) is characterized by the significant lines of the X-ray diffraction pattern shown in Table II.

TABLE II

| Interplanar Spacing d(Å) | Relative Intensity |
|---|---|
| 11.55 | 100B[1] |
| 7.54 | 13B |
| 6.59 | 05 |
| 5.94 | 09B |
| 4.82 | 07B |
| 4.36 | 07 |
| 4.13 | 11 |
| 3.94 | 49 |
| 3.58 | 04 |
| 3.50 | 08 |
| 3.30 | 05 |
| 3.10 | 18B |
| 3.01 | 04 |
| 2.90 | 04B |
| 2.68 | 09B |
| 2.07 | 10B |

[1]B designates a broad line.

The following examples are presented to illustrate the invention.

COMPARATIVE PREPARATION OF ZEOLITE BETA

Zeolite Beta was prepared in accordance with the prior art as given in Example 6 of U.S. Pat. No. Re. 28,341, as follows:

Solution A was prepared by dissolving 6.84 g aluminum metal powder in a solution of 12.5 g NaOH in 82 g H₂O. Solution B was prepared by dissolving 274.25 g silica gel (88% NVM in 1500 g TEA-OH (25% aqueous solution). Solution A was blended into solution B and the resulting slurry charged to a 2-liter autoclave. The charge was treated for 6 days at 150° C. with mild stirring. After cooling to room temperature, the product was filtered, washed and dried at 120° C. A total of 210.8 g product (77.5% NVM) was obtained. The X-ray diffraction pattern showed strong Beta zeolite crystallinity. The composition of the synthesis batch is given by the following ratios:

$H_2O/SiO_2 = 17.0$
$OH^-/SiO_2 = 0.71$
$Al/SiO_2 = 0.063$
$Na^+/SiO_2 = 0.077$
$TEA/SiO_2 = 0.63$

Analysis of the product showed 22.55% ignition loss, and on an ignition loss free basis: 94.71% $SiO_2$; 6.13% $Al_2O_3$; 0.37% Na and 1.67 nitrogen. Product composition expressed on the basis of mole $Al_2O_3$; $1.43(0.09Na^+.0.91TEA)_2O.Al_2O_3.26.2SiO_2.6H_2O$. The yield based on $SiO_2$ content was 64%.

"EXAMPLE 1"

Preparation of Preformed Gel

A sodium aluminate solution was prepared by dissolving 31.32 g sodium aluminate (43.4% $Al_2O_3$, 42.6% NaOH) in 300 g water; 15 g zeolite Beta seed crystals were suspended in this solution. To this solution/suspension, 801.2 g silica sol (DuPont's Ludox LS-30, 30% $SiO_2$) was added with good mixing. The resulting slurry was dried for three days at 120° C. The gel product was ground to a powder in a mortar; the non-volatile content (NVM) was 95.7%. The composition can be expressed by the following molar formula by synthesis:

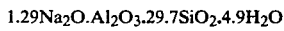

$1.29Na_2O.Al_2O_3.29.7SiO_2.4.9H_2O$ or by the ratios: $0.16H_2O/Si$; $0.043Na/Si$; $0.067Al/Si$ This example is not an example of the invention, but an example of the preformed gel component of the invention. It is designated herein "Example 1" to simplify reference to this synthesis.

EXAMPLE 2

Zeolite Beta Synthesis

2A: 70.6 g of the gel from Example 1 was blended into 89.4 g of a 25% solution of TEA-OH and charged to an autoclave.

2B: 45.3 g of the gel from Example 1 was blended into 114.7 g of a 25% solution of TEA-OH and charged to an autoclave.

2C: 26.4 g of the above gel was blended into 133.6 g of a 25% solution of TEA-OH and charged to an autoclave. All three charges, 2A, 2B, and 2C, were treated 6 days at 150° C. After cooling, the products were recovered by filtration, water washed, and dried at 120° C. Compositions of the synthesis batch and product inspections are given in Table III. Also given in Table III are product inspections and yields based on $SiO_2$ in the synthesis batch which appeared in the product.

TABLE III

| Example | 2A | 2B | 2C |
| --- | --- | --- | --- |
| Synthesis Batch | | | |
| $H_2O/SiO_2$ | 3.81 | 7.46 | 14.7 |
| $OH/SiO_2$ | 0.24 | 0.38 | 0.68 |
| $Al/SiO_2$ | 0.067 | 0.067 | 0.067 |
| $Na/SiO_2$ | 0.087 | 0.087 | 0.087 |
| $TEA/SiO_2$ | 0.149 | 0.297 | 0.594 |
| Cryst. Treatment (days/°C.) | 6/150 | 6/150 | 6/150 |
| Product Inspections | | | |
| X-ray crystallinity | Beta (S) | Beta (S) | Beta (S) |
| % Yield (based on $SiO_2$) | 86 | 83 | 81 |
| Wt. % $SiO_2$ | 90.8 | — | 91.2 |
| Wt. % $Al_2O_3$ | 5.8 | — | 5.9 |

TABLE III-continued

| Example | 2A | 2B | 2C |
| --- | --- | --- | --- |
| Al/Si (atom ratio) | 0.075 | — | 0.076 |

Products 2A and 2B are products in accordance with the present invention. Product 2C is not a product of the invention since the ratio of the $H_2O/Si$ is above 10.

EXAMPLE 3

(15890-13)

3A: 48.5 g of the gel from Example 1 was blended into a solution of 1.39 g NaOH in 40.9 g of a 25% solution of TEA-OH and charged to an autoclave.

3B: 48.5 g of the gel from Example 1 was blended into a solution of 4.17 g NaOH in 30.7 g water plus 21.1 g triethylamine and charged to an autoclave.

3C: 48.5 g of the gel from Example 1 was blended into 61.4 g of a 25% solution of TEA-OH and charged to an autoclave.

All three charges were treated 12 days at 150° C. After cooling, the products were recovered by filtration, water washed and dried at 120° C. Table II shows the synthesis batch compositions.

Example 3A showed a ZSM-8 type zeolite instead of zeolite Beta, possibly due to lower TEA-OH and higher NaOH content. ZSM-8 is described in British Pat. No. 1,334,243. Example 5F, with similar ratios but a more alumina-rich gel, gave good zeolite Beta. Triethylamine (Example 3B) is a less efficient templating agent than TEA-OH but still produced a significant amount of zeolite Beta with a longer crystallization treatment. Example 3C at 100° C. did not produce a crystalline product even after a 21-day treatment although Example 5B with similar ratios but a more alumina-rich gel gave good Beta at 100° C. Example 3C shows that the Beta seed crystals do not contribute too significantly to the observed X-ray crystallinity. Also the yield was much lower than for crystalline products. Products 3A and 3B are products of the invention. Product 3C was not crystalline and was not a product of the invention.

TABLE IV

| Example | 3A | 3B | 3C |
| --- | --- | --- | --- |
| Synthesis Batch | | | |
| $H_2O/SiO_2$ | 2.59 | 2.59 | 3.81 |
| $OH^-/SiO_2$ | 0.235 | 0.234 | 0.235 |
| $Al/SiO_2$ | 0.067 | 0.067 | 0.067 |
| $Na/SiO_2$ | 0.136 | 0.234 | 0.087 |
| $TEA/SiO_2$ | 0.099 | — | 0.149 |
| $N(C_2H_5)_3/SiO_2$ | — | 0.297 | — |
| Cryst. Treatment (days/°C.) | 12/150 | 12/1500 | 21/100 |
| Product Inspections | | | |
| X-ray crystallinity | ZSM-8 (M)[1] | MOR (W) + Beta (W)[2] | Amorphous |
| % Yield (based of $SiO_2$) | 84 | 81 | 53 |

[1]ZSM-8 (M) means medium crystallinity ZSM-8
[2]MOR (W) + Beta (W) means mordenite and zeolite Beta, both weakly crystalline

EXAMPLE 4

A larger batch of preformed gel was prepared using the procedure and proportions of Example 1 except that the zeolite Beta seed was omitted. The composition can be represented by the molar formula: $1.35\ Na_2O.Al_2O_3.29.7SiO_2$ with 95.,8% NVM. Seventy grams of this gel were blended into 88.4 g of a 25% solution of TEA- OH and charged to an autoclave (Sample 4A). A second 70 g portion of the gel was blended into 54.7 g of a 25% solution of tetramethylammonium hydroxide (TMA-OH) and charged to an autoclave (4B). A third 70 g portion of the gel was blended into 54.6 g of a 36.6% solution of methyltriethylammonium hydroxide (MTEA-OH) and diluted with 31.7 g water. The slurry was charged to an autoclave (4C). A fourth 70 g portion of the gel was blended into 76.3 g tetra-n-propylammonium hydroxide (TPA-OH) and diluted with 20.6 g water. The slurry was charged to an autoclave (4D). A fifth 70 g portion of the gel was calcined 16 hrs. at 200° C. during which treatment it lost 2.4 g $H_2O$. The calcined gel was blended into 88.4 g of 25% TEA-OH and charged to an autoclave (4E). The final 70 g gel portion was calcined 16 hrs. at 500° C. during which treatment it lost 3.3 g $H_2O$. The calcined gel was blended into 88.4 g of 25% TEA-OH and charged to an autoclave (4F).

All six portions were treated six days at 150° C. After cooling to ambient temperature, examination under an optical microscope indicated that 4C, 4E and 4F were not fully crystalline. Thus, they were resealed and treated another six days at 150° C.

Table V gives composition of the synthesis batch, crystallization conditions, and product inspections for these products. Examples 4B and 4D show that templating agents other than TEA give the products reported in the literature for high water content gels. The product of 4C is a new zeolite phase but shows a poorly defined X-ray diffraction pattern. Examples 4E and 4F show that calcination of the preformed gel may delay Beta crystallization but still gives good products.

EXAMPLE 5

Another batch of preformed gel was prepared using the procedure of Example 4 but richer in sodium aluminate. Composition by synthesis:

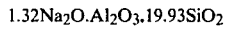

$1.32Na_2O.Al_2O_3.19.93SiO_2$ with 91.3% NVM. Seventy-five gram portions of this gel were combined with templating agents in manner similar to Example 4. Portions 5A, 5C, 5D, 5E and 5F were charged to autoclaves and treated six days at 150° C. Portion 5B was placed in a Pyrex bottle and treated 21 days at 100° C. Table IV gives composition of the synthesis batch, crystallization conditions, and product inspections.

The products of Example 5 were quite comparable to the parallel experiments in Example 3 indicating that the extra sodium aluminate has little effect on the crystallization reaction, i.e., TEA-OH produces Beta, TPA-OH produces ZSM-5, and TMA-OH produces NU-1. Example 5B made a good zeolite Beta product after 100° C. crystallization even though at a slower rate. Example 5F gave good zeolite Beta with 0.093 TEA/Si. The yields were consistently near 90%. Products 5A, 5B, 5C, 5D, 5E, and 5F were all products in accordance with the present invention.

TABLE VI

| Example | 5A | 5B | 5C | 5D | 5E | 5F |
|---|---|---|---|---|---|---|
| Synthesis Batch | | | | | | |
| $H_2O/SiO_2$ | 4.06 | 4.06 | 4.06 | 4.06 | 4.06 | 4.06 |
| $OH^-/SiO_2$ | 0.282 | 0.282 | 0.283 | 0.283 | 0.432 | 0.226 |
| $Al/SiO_2$ | 0.100 | 0.100 | 0.100 | 0.100 | 0.100 | 0.100 |
| $Na/SiO_2$ | 0.132 | 0.132 | 0.132 | 0.132 | 0.132 | 0.132 |
| Template/$SiO_2$ | 0.151 TEA | 0.151 TEA | 0.151 TMA | 0.151 TPA | 0.307 TEA | 0.093 TEA |
| Crystallization Treatment (days/°C.) | 6/150 | 21/100 | 6/150 | 6/150 | 6/150 | 6/150 |
| Product Inspections | | | | | | |
| X-ray crystallinity | Beta (S) | Beta (S) | NU-1 | ZSM-8 | Beta (S) | Beta (S) |
| % Yield (based on $SiO_2$) | 90 | 86 | 89 | 87 | 89 | 91 |

EXAMPLE 6

Another batch of preformed gel was prepared by neutralizing sodium silicate with a solution of aluminum sulfate and $H_2SO_4$. Solution A was 220.2 g $Al_2$-

TABLE V

| Example | 4A | 4B | 4C | 4D | 4E | 4F |
|---|---|---|---|---|---|---|
| Synthesis Batch | | | | | | |
| $H_2O/SiO_2$ | 3.91 | 3.91 | 3.91 | 3.91 | 3.78 | 3.73 |
| $OH^-/SiO_2$ | 0.241 | 0.241 | 0.241 | 0.241 | 0.241 | 0.241 |
| $Al/SiO_2$ | 0.067 | 0.067 | 0.067 | 0.067 | 0.067 | 0.067 |
| $Na/SiO_2$ | 0.091 | 0.091 | 0.091 | 0.091 | 0.091 | 0.091 |
| Template/$SiO_2$ | 0.151 TEA | 0.151 TMA | 0.151 MTEA | 0.151 TPA | 0.151 TEA | 0.151 TEA |
| Crystallization Treatment (days/°C.) | 6/150 | 6/150 | 12/150 | 6/150 | 12/150 | 12/150 |
| Product Inspections | | | | | | |
| X-Ray crystallinity | Beta (S) | NU-1[1] | UCM (W)[2] | ZSM-5 | Beta (S) | Beta (S) |
| % Yield (based on $SiO_2$) | 89 | 85 | 82 | 89 | 83 | 89 |
| Wt. % $SiO_2$ | 90.9 | 89.1 | — | 88.8 | 87.7 | 90.8 |
| Wt. % $Al_2O_3$ | 5.0 | 5.0 | — | 4.7 | 4.7 | 5.0 |
| Al/Si (atom ratio) | 0.065 | 0.066 | — | 0.062 | 0.063 | 0.065 |

[1]U.S. Pat. No. 4,060,590
[2]Unidentified material, weakly crystalline

Products 4A, 4B, 4D, 4E, and 4F were products in accordance with invention. Product 4C could not be definitely identified with X-ray diffraction as being a zeolite and, hence, it is not a product of the invention.

$(SO_4)_3.18H_2O$ plus 1114 g water and 170 g $H_2SO_4$(96%). To this was added 2094 g sodium silicate (3.25 $SiO_2/Na_2O$, 1.40 sp.gr.) slowly with good mixing; the resulting slurry showed pH=6.5. It was filtered, washed twice with water, and dried at 110° C. The product (90.2% NVM) was ground to a fine powder. Its composition by synthesis:

$$0.43Na_2O.Al_2O_3.30.5SiO_2 \text{ (dry basis)}.$$

Ten percent portions (76.6 g) of this gel were treated with 88.4 g of 25% TEA-OH (Example 6A), 54.7 g of 25% TMA-OH plus 25.3 g water (Example 6B), and 76.3 g of 40% TPA-OH plus 20.6 g water (Example 6C) in a manner similar to Example 4. All were treated for six days at 150° C. Table VII shows the composition of the synthesis batch, crystallization conditions, and product inspections. Products 6A, 6B, and 6C are products in accordance with the invention.

The products of Example 6 are quite comparable to Example 3 indicating that the particular silica and alumina sources used in preparing the aluminosilicate gel are not critical to the synthesis, i.e., TEA-OH produced Beta, TMA-OH produced NU-1, and TPA-OH produced ZSM-8. The soda content in this gel was much lower than earlier examples; it was the sodium sulfate residue of imperfect washing of the gel before drying. This, too, had little effect on the synthesis.

TABLE VII

| Example | 6A | 6B | 6C |
|---|---|---|---|
| Synthesis Batch | | | |
| $H_2O/SiO_2$ | 4.00 | 4.00 | 4.00 |
| $OH^-/SiO_2$ | 0.146 | 0.146 | 0.146 |
| $Al/SiO_2$ | 0.066 | 0.066 | 0.066 |
| $Na/SiO_2$ | 0.028 | 0.028 | 0.028 |
| $Template/SiO_2$ | 0.146 TEA | 0.146 TMA | 0.146 TPA |
| Cryst. Treatment (days/°C.) | 6/150 | 6/150 | 6/150 |
| Product Inspections | | | |
| X-ray crystallinity | Beta (S) | NU-1 | ZSM-8 |
| % Yield (based on $SiO_2$) | 78 | 81 | 77 |

What is claimed is:

1. In a method for the preparation of a crystalline aluminosilicate which comprises:
   (a) forming a reaction mixture comprising a source of alumina, a source of silica, a source of an organic templating agent and water;
   (b) maintaining said mixture at a temperature ranging from about 75° to about 200° C. until crystals of a zeolite are formed, and
   (c) recovering said zeolite from said reaction mixture, the improvement which comprises:
   (d) first forming an aluminosilicate gel having less than about 10 mole $H_2O$ per gram atom of silicon and an alkali metal content of less than about 0.4 atom per atom of silicon, said aluminosilicate gel having been prepared by reacting a source of silica, a source of alumina and water to form an aluminosilicate hydrogel, washing said hydrogel to remove at least a portion of said residual soluble salts, and drying the washed hydrogel at conditions to form said gel having less than 10 moles $H_2O$ per gram atom of silicon, and
   (e) subsequently mixing said organic templating agent with said gel, said reaction mixture having a mole ratio of $H_2O/SiO_2$ ranging from 2 to 10.

2. The method of claim 1 wherein said recovered zeolite is calcined at a temperature ranging from about 200° C. to 900° C. to produce a calcined zeolite which is the thermal decomposition product of said recovered zeolite.

3. The method of claim 2 wherein said gel comprises less than about 5 moles $H_2O$ per gram atom at silicon and less than 0.2 atom of alkali metal per gram atom of silicon.

4. The method of claim 1 wherein said source or organic templating agent is selected from the group consisting of quaternary ammonium compounds, alcohols, amines and mixtures thereof.

5. The method of claim 1 wherein said hydrogel is dried at a temperature ranging from about 90° to about 600° C.

6. The method of claim 1 wherein said recovered zeolite is treated with a fluid medium comprising a cation selected from the group consisting of a metal of Groups I through VIII of the Periodic Table of Elements, hydrogen ion, ammonium ion and mixtures thereof to ion exchange said recovered zeolite.

7. The method of claim 2 wherein said calcined zeolite is treated with a fluid medium comprising a cation selected from the group consisting of metals of Groups I through VIII of the Periodic Table of Elements, hydrogen ion, ammonium ion and mixtures thereof to ion exchange said calcined zeolite.

8. The method of claim 1 wherein a metal component is deposited on said recovered zeolite, said metal being selected from the group consisting of a metal of Groups I through VIII of the Periodic Table of Elements, and mixtures thereof.

9. The method of claim 2 wherein a metal component is deposited on said calcined zeolite, said metal component being selected from the group consisting of a metal of Groups I through VIII of the Periodic Table of Elements and mixtures thereof.

10. The method of claim 1 wherein said zeolite is a Beta-type zeolite.

11. The method of claim 2 wherein said calcined zeolite is a ZSM-8-type zeolite.

12. The method of claim 2 wherein said calcined zeolite is a calcined Beta-type zeolite.

13. The method of claim 1 wherein said gel is represented by the formula:

$$MalO_2.xSiO_2$$

wherein M is a cation selected from the group consisting of an alkali metal cation, a hydrogen cation and mixtures thereof and x is a number ranging from 5 to 200, said organic templating agent comprising a tetraethyl ammonium cation (TEA), said reaction mixture having the following composition in terms of mole ratios relative to one mole of silica:

| $H_2O/SiO_2$ | from 2 to 10 |
|---|---|
| $OH^-/SiO_2$ | from 0 to 1 |
| $Al/SiO_2$ | from 0.01 to 0.2 |
| Alkali metal/$SiO_2$ | from 0 to 0.4 |
| $TEA/SiO_2$ | from 0.05 to 0.6 | and wherein said recovered zeolite has a composition, in terms of mole ratios, represented by the formula:

$$1.3\pm0.2[xM+(1-x)R]_2O.Al_2O_3.ySiO_2.wH_2O$$

wherein x is a number less than 1, y is a number greater than 10 but less than 200, w is a number up to 40, M represents a hydrogen cation, an alkali metal cation or mixtures thereof, R represents a tetraethylammonium cation, said recovered zeolite being characterized by the significant lines of the X-ray diffraction pattern shown in Table I.

14. The method of claim 13 wherein said recovered zeolite is calcined at a temperature ranging from about 200° to about 900° C. to produce a Beta-type zeolite represented by the formula:

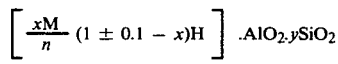

wherein x is a number less than 1, y is a number greater than 10 but less than 200, M is a cation selected from the group consisting of hydrogen, an alkali metal and mixtures thereof, and n is the valence of M, said Beta-type zeolite having the significant lines of the x-ray diffraction pattern shown in Table II.

15. The method of claim 13 wherein said source of alumina is sodium aluminate, said source of silica is colloidal silica sol and said source of tetraethyl ammonium ion is tetraethylammonium hydroxide or tetraethylammonium chloride.